(12) United States Patent
Ferris

(10) Patent No.: US 8,935,692 B2
(45) Date of Patent: Jan. 13, 2015

(54) SELF-MANAGEMENT OF VIRTUAL MACHINES IN CLOUD-BASED NETWORKS

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 1742 days.

(21) Appl. No.: 12/125,587

(22) Filed: May 22, 2008

(65) Prior Publication Data

US 2009/0293056 A1    Nov. 26, 2009

(51) Int. Cl.
   *G06F 12/08*    (2006.01)
   *G06F 9/50*     (2006.01)
   *G06F 9/455*    (2006.01)

(52) U.S. Cl.
   CPC .... *G06F 9/5077* (2013.01); *G06F 2009/45562* (2013.01); *G06F 2009/45575* (2013.01); *G06F 9/45554* (2013.01); *G06F 9/45533* (2013.01)
   USPC .......................................................... 718/1

(58) Field of Classification Search
   CPC ............ G06F 9/45544; G06F 9/45554; G06F 2009/45562; G06F 2009/45575
   USPC .......................................................... 718/1
   See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 7,962,545 B2 * | 6/2011 | Knauerhase et al. | 709/203 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |

(Continued)

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

(Continued)

*Primary Examiner* — Robert Fennema
(74) *Attorney, Agent, or Firm* — Lowenstein Sandler LLP

(57) ABSTRACT

A cloud management system can insert a self-management module in virtual machines. The self-management module can be configured to automatically perform management functions on the virtual machine in which it is inserted. The management functions can include activation, suspension, or termination of the virtual machine. The management functions can also include tracking and monitoring the virtual machine. The management functions can also include providing messages to the cloud management system regarding the status and usage of the virtual machine.

21 Claims, 5 Drawing Sheets

(56) References Cited

U.S. PATENT DOCUMENTS

| | | |
|---|---|---|
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0201711 A1* | 8/2008 | Amir Husain ................... 718/1 |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2011/0016214 A1 | 1/2011 | Jackson |
| 2011/0131335 A1 | 6/2011 | Spaltro et al. |

OTHER PUBLICATIONS

Morgan, "Systems and Methods for Metering Cloud Resource Consumption Using Multiple Hierarchical Subscription Period", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.
White Paper—"rPath Versus Other Software Appliance Approaches", Mar. 2008, rPath, Inc., www.rpath.com, 9 pages.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
Ferris, "Methods and Systems for Providing a Universal Marketplace for Resources for Delivery to a Cloud Computing Environment", U.S. Appl. No. 12/475,228, filed May 29, 2009.
DeHaan et al., "Systems and Methods for Power Management in Managed Network Having Hardware-Based and Virtual Reources", U.S. Appl. No. 12/475,448, filed May 29, 2009.
DeHaan et al., "Methods and Systems for Flexible Cloud Management with Power Management Support", U.S. Appl. No. 12/473,987, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan, "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris, "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environment", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al, "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.

(56) References Cited

OTHER PUBLICATIONS

Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
DeHaan, "Methods and Systems for Abstracting Cloud Management", U.S. Appl. No. 12/474,113, filed May 23, 2009.
Ferris, et al., "Systems and Methods for Cominatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation information Using Cioud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
"rBuilder and the rPath Appliance Platform", Feb. 12, 2007, rPath, Inc., www.rpath.com, 2 pages.
White Paper—"Best Practices for Building Virtual Appliances", Nov. 15, 2007, rPath, Inc., www.rpath.com, 8 pages.

* cited by examiner

SELF-MANAGEMENT OF VIRTUAL MACHINES IN CLOUD-BASED NETWORKS

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Once the virtual machines begin running in the cloud, the user or the cloud itself must manage the virtual machines. The management may include the instantiation, cloning, termination, and re-instantiation of the virtual machines. Due to the potentially large number of virtual machines running in a cloud, the virtual machines may become "lost" and continue to run in the cloud beyond their intended lifespan. As such, the lost virtual machines continue to consume resources from the cloud and cost the user excess fees for the consumption of resources, or cause other unintended effects. Thus, there is a need in the art for methods and systems that provides for automatic management of virtual machines in a cloud computing environment.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
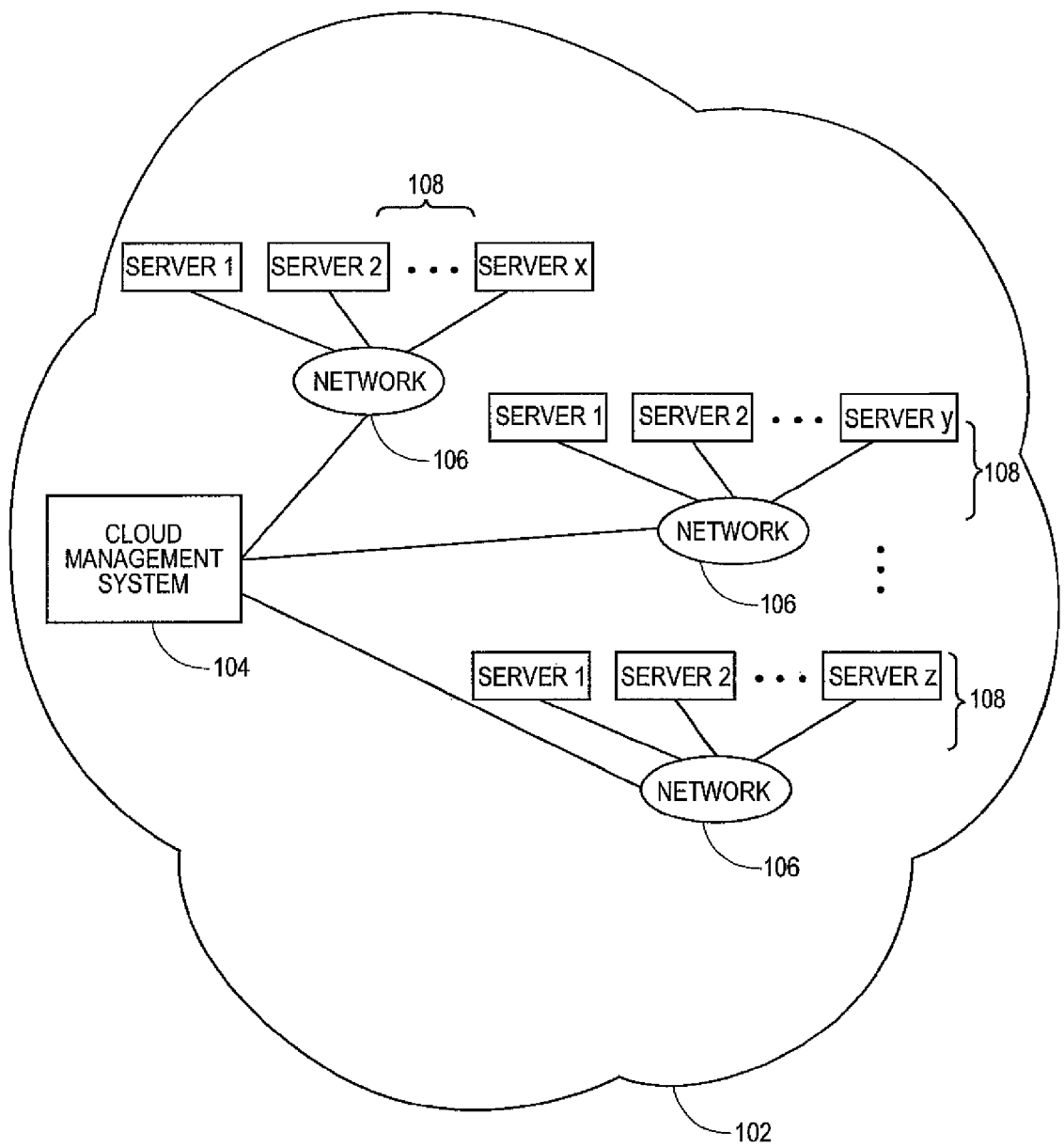
FIG. 1 illustrates an overall cloud system architecture in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for automatic self-management of cloud-based virtual machines. More particularly, embodiments relate to platforms and techniques in which a cloud management system can insert a self-management module in virtual machines, and the self-management module can perform management functions to control a particular virtual machine.

According to embodiments, in general, a user can request instantiation of a virtual machine in a cloud computing environment. The user can request the instantiation of virtual machines from a cloud computing environment, which can include a set of resource servers configured to deliver processor cycles, operating systems or components thereof, applications, input/output bandwidth, or other computing resources. The cloud management system identifies the resources necessary to build and launch virtual machines to the user's specification, and requests those resources from the set of resource servers.

According to embodiments, at the users request or independently, the cloud management system can be configured to insert a self-management module in the virtual machine. The self-management module can be inserted into the virtual machine during building, prior to instantiation, or can be inserted into the virtual machine after instantion. The self-management module can be configured to automatically perform management functions on the virtual machine in which it is inserted.

The management functions can include activation, suspension, or termination of the virtual machine. The management functions can also include tracking and monitoring the virtual machine. The management functions can also include providing messages to the cloud management system regarding the status and usage of the virtual machine. For example, the self-management module can message the cloud management system regarding the operating status (activated, suspended, or terminated), errors in the virtual machine, the usage of the virtual machine (instantiation duration, resources consumed).

By including a self-management module in the virtual machines, the virtual machines can perform management function without input from the user or cloud management system. As such, the likelihood of virtual machines being lost can be reduced thereby maximizing cloud resources and reducing cost to users.

FIG. 1 illustrates an overall cloud computing environment, in systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102; either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
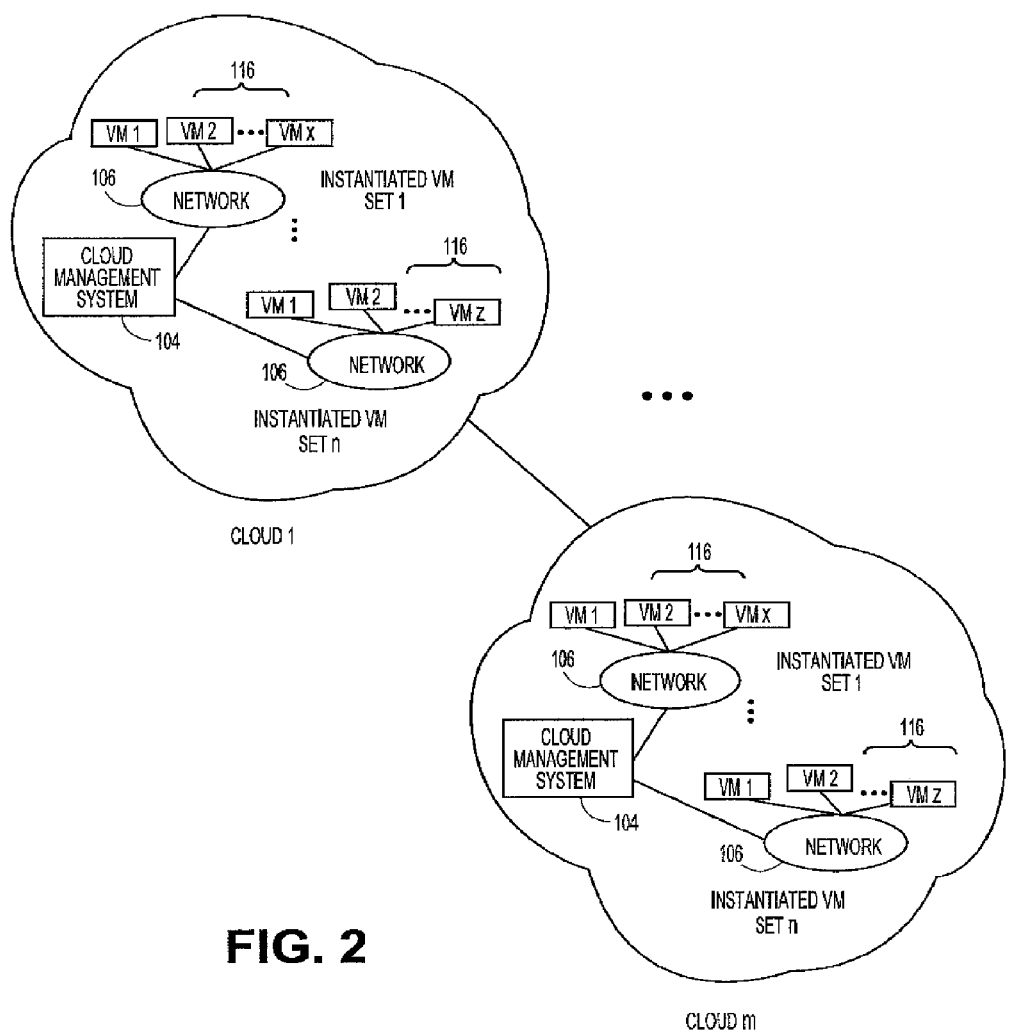
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud can 102, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
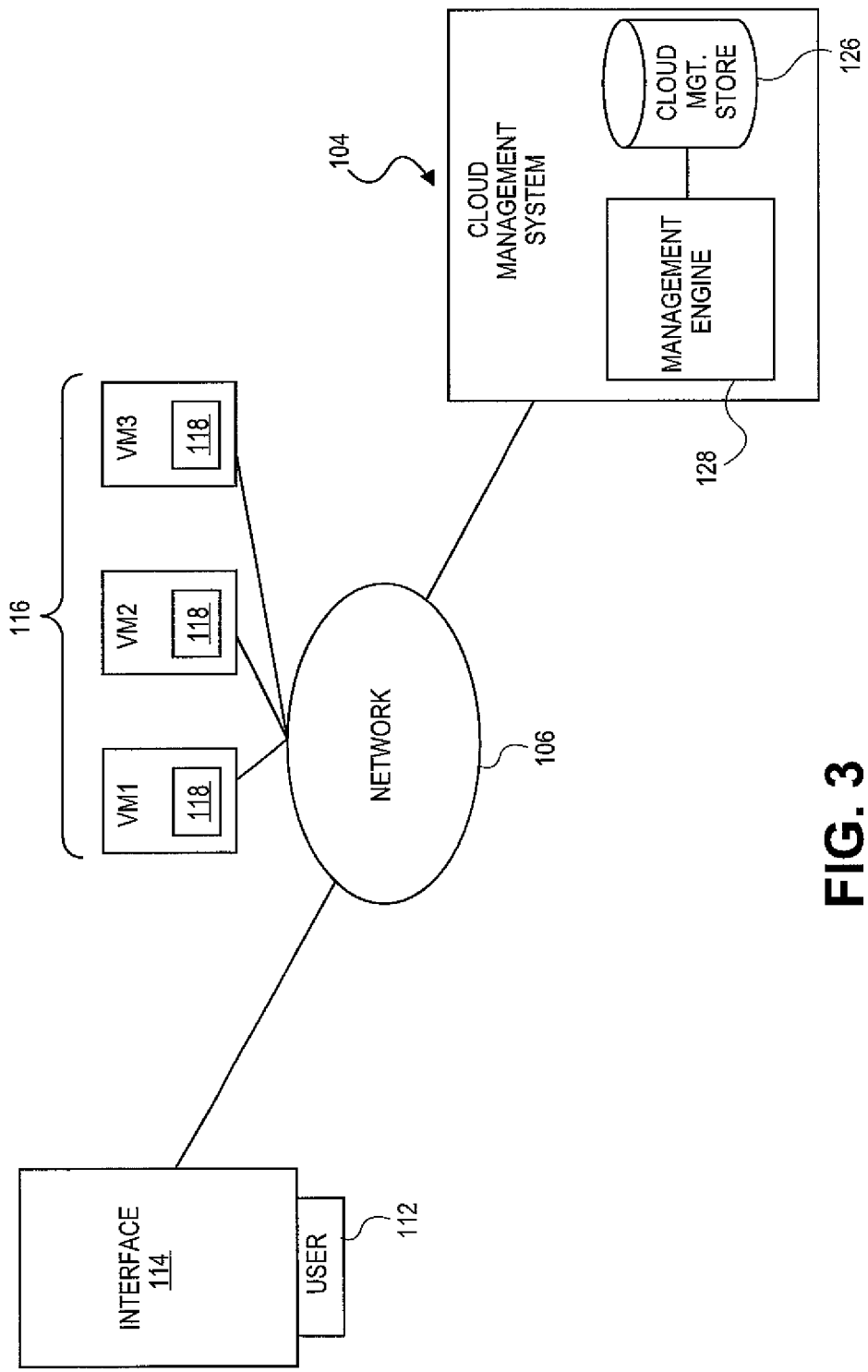
FIG. 3 illustrates a network configuration in which virtual machines perform self-management, according to various embodiments.

FIG. 3 illustrates aspects of a cloud management system 104 and the self-management of virtual machines 116 of a cloud 102, according to various embodiments. In embodiments as shown, the cloud management system 104 can comprise a management engine 128 containing control logic for performing the processes of cloud management and a cloud management store 126. In embodiments as shown, the cloud management system 104 can be configured to build and communicate with instantiated virtual machines 116 via one or more networks 106, such as the Internet or other public or private network. The virtual machines 116 can be or include, for instance, a set of virtual servers that can support on-line services or sites, such as Web storefronts or music download or other media delivery. In embodiments as shown, the building of the instantiated virtual machines 116 can be initiated based on an instantiation request from a user 112, including the specification for software, computing, or other resources.

The cloud management system 104 can be configured to communicate with the user 112 via an interface 114 to allow the user to subscribe to cloud 102 and request instantiation of virtual machine 116. The interface 114 can be any type of interface to allow the user to communicate information to the cloud management system 104. For example, the interface 114 can be a specific graphical, command-line, or other interface generated by a program or application designed to communicate with the cloud management system 104. Likewise, the interface 114 can be an interface generated in conventional formats, such as .html, capable of being executed in network programs and applications, such as a web browser.

During the subscription, the cloud management system 104 can collect information from the user 112 in order to track the user's subscription to the cloud 102. The cloud management system 104 can collect information such as identity, payment and billing information, and desired cloud usage. The cloud management system 104 can maintain the subscription information in cloud management store 126.

Additionally, the user 112 can request the instantiation of virtual machines 116 in cloud 102. The cloud management system 104 can be configured to receive the request via interface 114. To instantiate the virtual machines 116, the cloud management system 104 can, for example, set the operating system, application, processing level, bandwidth, and other parameters specifying the resources and capability of the virtual machines 116.

As part of the process of building the virtual machines 116, the cloud management system 104 can instantiate the virtual machines 116 and embed a management ID into each virtual machine 116. The management ID can be, for instance, a file, certificate, cookie, or other identification object encoding a unique identifier for that virtual machine. The incorporation of management ID into the virtual machines 116 can permit cloud management system 104 to directly configure, manage, store and track the virtual machines 116.

In embodiments, as part of the process of building the virtual machines 116, the cloud management system 104 can be configured to insert a self-management module 118 into each virtual machine 116. The self-management module 118 can be configured to perform various management functions of a particular virtual machine 116 into which it is inserted. The management functions can include activation, suspension, or termination of the particular virtual machine 116, monitoring of the status and usage of the particular virtual machine 116, and messaging regarding the status and usage of the particular virtual machine 116. The self-management module 118 can be inserted at the request of the user 112 or independently by the cloud management system 104. The self-management module 118 can be inserted into the virtual machine 116 during building, prior to instantiation of the virtual machine 116, or can be inserted after instantiation of the virtual machine 116.

The self-management module 118 can include a set of utilities and tools to automatically perform the management functions of an individual virtual machine 116. The self-management module 118 can be implemented in any known scripting or programming language such as PERL, shell scripting, JAVA, and the like.

In embodiments, the self-management module 118 can be configured to activate the associated virtual machine 116. The self-management module 118 can be configured to activate the virtual machine 116 upon instantiation of the virtual machine 116. Likewise, the self-management module 118 can be configured to activate the virtual machine 116 upon the occurrence of a particular event or to re-activate the virtual machine 116 after it has been suspended or terminated. For example, the self-management module 118 can activate the virtual machine 116 at a particular time period.

In embodiments, the self-management module 118 can be configured to monitor and track the particular virtual machine 116 with which it is associated. The self-management module 118 can monitor and track the status of the virtual machine 116. For example, the self-management module 118 can monitor the virtual machine 116 for errors. In response to an error, the self-management module 118 can repair the virtual machine 116, or suspend or terminate the virtual machine 116.

Additionally, in embodiments, the self-management module 118 can track or meter the consumption of cloud 102 resources by the particular virtual machine 116 and can track the utilization of the particular virtual machine 116 by the user 118 or other third parties. For example, the management engine 128 can track such data as the duration the particular virtual machine 116 is instantiated in the cloud 102, the time period that the particular virtual machine 116 is instantiated (peak or off-peak times), and the computing resources consumed by the particular virtual machine 116 (number of resource servers, computing cycles, bandwidth, memory usage, storage usage). The self-management module 118 can track and meter the consumption by querying the cloud 102 or cloud management system 104 regarding the usage of the particular virtual machine 116.

In embodiments, the self-management module 118 can be configured to suspend or terminate the particular virtual machine 116 with which it is associated. The self-management module 118 can be configured to suspend or terminate the virtual machine 116 upon the occurrence of a particular event or based on the monitoring of the virtual machine 116, such as a error in the virtual machine 116 or the end of the lifespan of the virtual machine 116. The self-management module 118 can terminate the particular virtual machine by ceasing the process of the virtual machine 116 and by ceasing consumptions of resources from the cloud 102. Likewise, if the virtual machine 116 exists in storage or memory in the cloud 102, the self-management module 118 can instruct the cloud 102 or the cloud management system 104 to erase or purge the virtual machine 116 upon termination of the virtual machine 116.

For example, the self-management module 118 can be configured to suspend or to terminate a virtual machine 116 based on one or more of the following situations:

1. The self-management module 118 module can track the duration (hours, days, months, years) a particular virtual machine 116 has been active. The self-management module 118 can terminate the virtual machine 116 upon reaching a specific or predetermined duration.

2. The self-management module 118 can monitor and track the resources of cloud (e.g. computer cycles, memory, bandwidth) utilized or consumed by the particular virtual machine 116. The self-management module 118 can suspend or terminate the virtual machine 116 upon reaching a specific or predetermined amount of resources consumed. Additionally, the self-management module 118 can suspend or terminate the virtual machine 116 if there is inactivity in resources utilized or consumed by virtual machine 116. Also, the self-management module 118 can suspend or terminate the virtual machine 116 if there is over utilization of resources utilized or consumed by the virtual machine beyond an expected or predetermined amount (e.g. consuming more bandwidth than expected).

3. In the above 1. and 2., the self-management module 118 can also monitor a monetary rate charged for duration (e.g. rate per hour of activity) and/or a monetary rate charged for resource consumption (e.g. rate per computer cycle utilized). The self-management module 118 can terminate the virtual machine 116 upon reaching a specific or predetermined charge for the particular virtual machine 116 activity. Other parameters in addition to those in (1), (2), and (3) can be tracked.

In embodiments, the self-management module 118 can be configured to update and inform the cloud management system 104 and/or user 112 on the status and activity of the particular virtual machine 116. The self-management module 118 can send messages informing the cloud management system 104 or user 112 of the status (active, suspended, or terminated), the monitored or tracked usage, and errors. The self-management module 118 can send the messages via network 106 in any well-known communications protocol such as TCP/IP, UDP, and the like.

Figure 4:
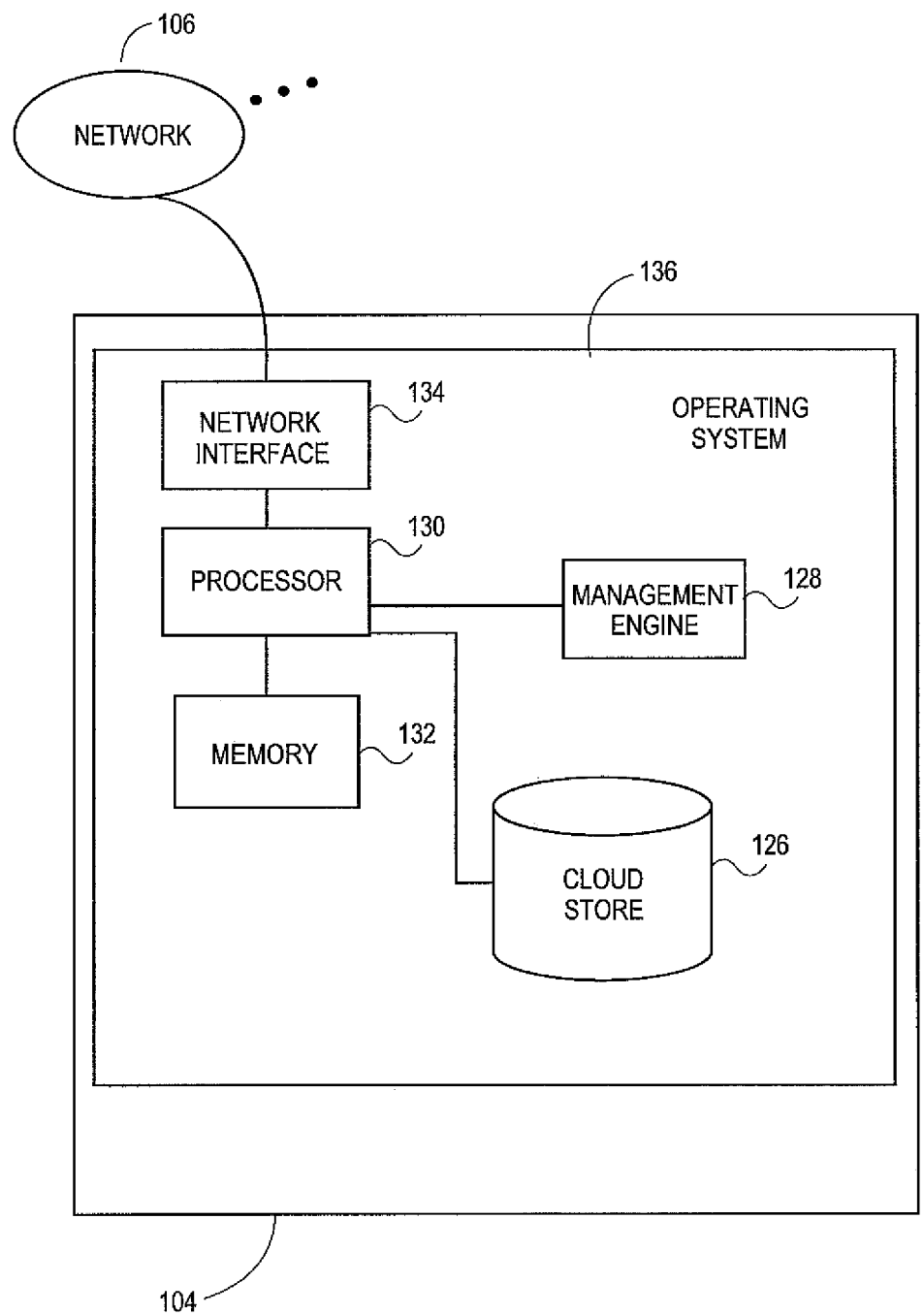
FIG. 4 illustrates an exemplary hardware configuration for a cloud management system, according to various embodiments.

FIG. 4 illustrates an exemplary diagram of hardware and other resources that can be incorporated in a cloud management system 104 configured to communicate with instantiated virtual machines 116 and the user 118 via one or more networks 106, according to embodiments. In embodiments as shown, cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with cloud management store 126, such as a database stored on a local hard drive. Processor 130 further communicates with network interface 134, such as an Ethernet or wireless data connection, which in turn communicates with one or more networks 106, such as the Internet or other public or private networks. Processor 130 also communicates with cloud management store 126 and management engine 128, to execute control logic and control the operation of virtual machines and other resources in cloud 102. Processor 130 also communicates with cloud management store 126 and management engine 128, to execute control logic to build and insert self-management modules in the virtual machines. Other configurations of cloud management system 104, associated network connections, and other hardware and software resources are possible.

Figure 5:
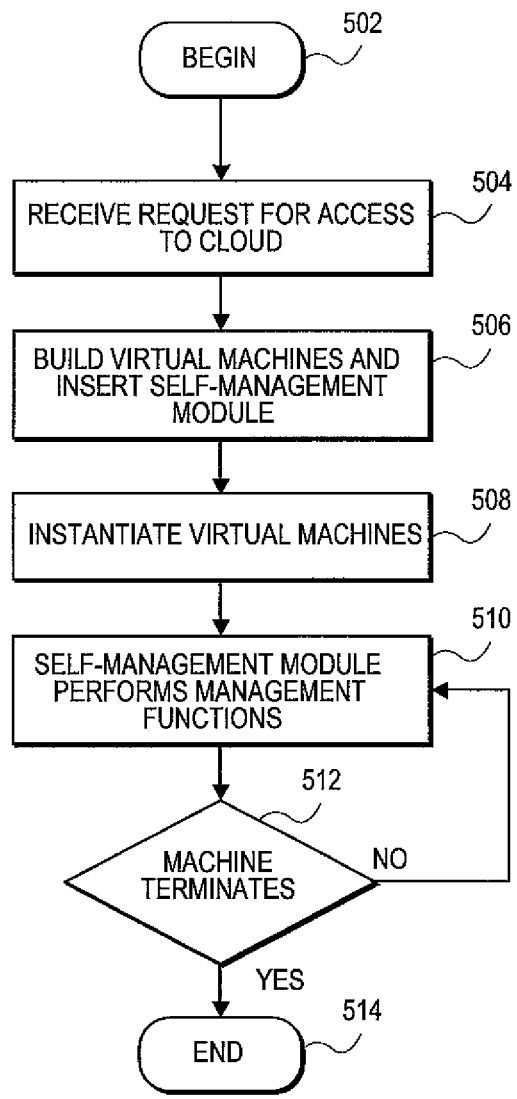
FIG. 5 illustrates a flowchart for overall virtual machine self-management, according to various embodiments.

FIG. 5 illustrates a flow diagram of overall subscription management in a cloud environment, according to embodiments of the present teachings. In 502, processing can begin. In 504, cloud management system 104 can receive a request from a customer, administrator, or other user to instantiate virtual machines or other resources in cloud 102. In 506, the cloud management system 104 can build the virtual machines according to the request and insert a self-management module into a virtual machine. The self-management module can be inserted at the request of the user or independently by the cloud management system 104. As illustrated, the self-management module can be inserted during building prior to instantiation. Likewise, the self-management module can be inserted after instantiation of the virtual machine.

In 508, the cloud management system 104 can instantiate virtual machines as requested by the user. Once instantiated, in 510, the self-management module can begin performing the management process of the virtual machine. The management functions can include activation, suspension, or termination of the virtual machine 116, monitoring of the status and usage of the virtual machine 116, and messaging regarding the status and usage of the virtual machine 116. In 512, the self management module can continue the management functions until the virtual machine is terminated.

Then, in 514, if the user terminates access to the cloud 102, the process can end, but the process can return to any point and repeat.

In the foregoing and other embodiments, the user making an instantiation request or otherwise accessing the cloud network can be a person, customer, subscriber, corporation, organization, or other entity. In embodiments, the user can be or include another virtual machine, application or process. In further embodiments, multiple users or entities can share the use of a set of virtual machines or other resources.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   instantiating, by a processor of a cloud management server computing device, a plurality of virtual machines in a cloud computing environment comprising a set of hosted resource server devices, the plurality of virtual machines instantiated on the set of hosted resource server devices in response to an instantiation request from an end user of the cloud computing environment, wherein the plurality of virtual machines operate together to provide a requested use for the end user for a defined duration; and
   for each virtual machine of the plurality of virtual machines, inserting, by the processor of the cloud management server computing device, a management module in the virtual machine, wherein the management module is configured to, without any involvement from the cloud management server computing device;
monitor the corresponding virtual machine;
control the corresponding virtual machine by at least one of activating, suspending, or terminating the corresponding virtual machine in view of the monitoring; and
transmit a message to the cloud management server computing device indicating the activation, the suspension, or the termination of the corresponding virtual machine, wherein the cloud management server computing device to manage subscriptions of the end user to the cloud computing environment in view of the message.

2. The method of claim 1, wherein the management module for each virtual machine of the plurality of virtual machines is to monitor at least one of a time period for the corresponding virtual machine, a duration of the corresponding virtual machine, or a resource usage of the corresponding virtual machine.

3. The method of claim 2, wherein the management module for each virtual machine of the plurality of virtual machines is to transmit a message to a cloud management system indicating the monitored at least one of the time period, the duration, or the resource usage.

4. The method of claim 2, wherein the management module for each virtual machine of the plurality of virtual machines is to terminate the corresponding virtual machine in view of the monitored at least one of the time period, the duration, or resource usage.

5. The method of claim 1, wherein the management module for each virtual machine of the plurality of virtual machines is to suspend the corresponding virtual machine in view of a time period for the corresponding virtual machine, a duration of the corresponding virtual machine, or a resource usage of the corresponding virtual machine.

6. The method of claim 1, wherein the cloud computing environment comprises a set of resource servers to deliver resources to instantiate the plurality of virtual machines.

7. The method of claim 1, wherein the management module for each virtual machine of the plurality of virtual machines is inserted in the corresponding virtual machine prior to instantiation of the corresponding virtual machine or after instantiation of the corresponding virtual machine.

8. A system comprising:
a memory;
a processor communicably coupled to the memory;
a network interface device communicably coupled to the memory and the processor; and
a cloud management module executable from the memory by the processor, wherein the cloud management module is communicably coupled to a set of hosted resource server devices of a cloud computing environment via the network interface device, the cloud management module performs operations executable by the processor to:
instantiate a plurality of virtual machines in the cloud computing environment comprising a set of hosted resource server devices, the plurality of virtual machines instantiated on the set of hosted resource server devices in response to an instantiation request from an end user of the cloud computing environment, wherein the plurality of virtual machines operate together to provide a requested use for the end user for a defined duration; and
for each virtual machine of the plurality of virtual machines, insert a management module in the virtual machine, wherein the management module is to, without any involvement from the cloud management server computing device;
monitor the corresponding virtual machine;
control the corresponding virtual machine by at least one of activating, suspending, or terminating the corresponding virtual machine in view of the monitoring; and
transmit a message to the cloud management server computing device indicating the activation, the suspension, or the termination of the corresponding virtual machine, wherein the cloud management server computing device to manage subscriptions of the end user to the cloud computing environment in view of the message.

9. The system of claim 8, wherein the management module for each virtual machine of the plurality of virtual machines is to monitor at least one of a time period for the corresponding virtual machine, a duration of the corresponding virtual machine, or a resource usage of the corresponding virtual machine.

10. The system of claim 9, wherein the management module for each virtual machine of the plurality of virtual machines is to transmit a message to the cloud management module indicating the monitored at least one of the time period, the duration, or the resource usage.

11. The system of claim 9, wherein the management module for each virtual machine of the plurality of virtual machines is to the corresponding virtual machine in view of the monitored at least one of the time period, the duration, or the resource usage.

12. The system of claim 8, wherein the management module for each virtual machine of the plurality of virtual machines is to suspend the corresponding virtual machine in view of a time period for the corresponding virtual machine, a duration of the corresponding virtual machine, or a resource usage of the corresponding virtual machine.

13. The system of claim 8, wherein the management module for each virtual machine of the plurality of virtual machines is inserted in the corresponding virtual machine prior to instantiation of the corresponding virtual machine or after instantiation of the corresponding virtual machine.

14. The system of claim 8, wherein the cloud computing environment comprises a set of resource servers to deliver resources to instantiate the plurality of virtual machines.

15. A method comprising:
receiving, by each of a plurality of virtual machines executed by a processor on a hosted resource server device of a set of hosted resource server devices of a cloud computing environment, a management module from a cloud management server device of the cloud computing environment, wherein each virtual machine of the plurality of virtual machines having a corresponding management module;
executing, by the processor of each virtual machine of the plurality of virtual machines, the management module corresponding to the virtual machine as part of the virtual machine;
monitoring, by each management module without any involvement from the cloud management server computing device, the virtual machine corresponding to the management module;
controlling, by each management module without any involvement from the cloud management server computing device, the virtual machine corresponding to the management module, the controlling performed by the management module comprising at least one of activating, suspending, or terminating the corresponding virtual machine in view of the monitoring; and transmitting, by each management module without any involvement from the cloud management server computing device, a message to the cloud management server computing device indicating the activation, the suspension, or the termination of the corresponding virtual machine, wherein the cloud management server computing device to manage subscriptions of the end user to the cloud computing environment in view of the message;

wherein each virtual machine of the plurality of virtual machines is instantiated by the cloud management server device in response to an instantiation request from an end user of the cloud computing environment in order to provide an intended use for the end user for a defined duration.

16. The method of claim 15, wherein the management module for each virtual machine of the plurality of virtual machines is to monitor at least one of a time period for the virtual machine, a duration of the virtual machine, or a resource usage of the virtual machine.

17. The method of claim 16, wherein the management module for each virtual machine of the plurality of virtual machines is configured to transmit a message to a cloud management system indicating the monitored at least one of the time period, the duration, or the resource usage.

18. The method of claim 16, wherein the management module for each virtual machine of the plurality of virtual machines is to terminate the virtual machine in view of the monitored at least time period, duration, or resource usage.

19. The method of claim 15, wherein the management module for each virtual machine of the plurality of virtual machines is to suspend the virtual machine in view of a time period for the virtual machine, a duration of the virtual machine, or a resource usage of the virtual machine.

20. The method of claim 15, wherein the management module for each virtual machine of the plurality of virtual machines is received by the virtual machine prior to instantiation of the virtual machine or after instantiation of the virtual machine.

21. The method of claim 15, wherein the cloud computing environment comprises a set of resource servers to deliver resources to instantiate the plurality of virtual machines.

* * * * *